United States Patent [19]
Davidor

[11] Patent Number: 5,809,489
[45] Date of Patent: Sep. 15, 1998

[54] METHOD FOR DETERMINING A STOWAGE PLAN

[75] Inventor: Yuval Davidor, Moshav Avihail, Israel

[73] Assignee: Schema-Evolutionary Algorithms Ltd., Herzlia, Israel

[21] Appl. No.: 667,748

[22] Filed: Jun. 21, 1996

[30] Foreign Application Priority Data

Mar. 20, 1996 [IL] Israel ........................................ 117588

[51] Int. Cl.$^6$ ............................. G06F 19/00; G06F 15/18
[52] U.S. Cl. .................................................. 706/13; 705/8
[58] Field of Search ........................... 395/13, 207; 705/8

[56] References Cited

U.S. PATENT DOCUMENTS

| | | | |
|---|---|---|---|
| 5,140,530 | 8/1992 | Guha et al. | 395/13 |
| 5,249,259 | 9/1993 | Harvey | 395/13 |
| 5,255,345 | 10/1993 | Shaefer | 395/13 |
| 5,319,781 | 6/1994 | Syswerda | 705/8 |
| 5,375,195 | 12/1994 | Johnston | 395/135 |
| 5,541,848 | 7/1996 | McCormack et al. | 395/13 |
| 5,623,413 | 4/1997 | Matheson et al. | 705/8 |

OTHER PUBLICATIONS

Lloyds List, "Mexico: Varacruz Port Terminal Manages go On–line", Jun. 20, 1995.
Story, Carrie, "Pushing the Boundaries of Software Technology", Dec. 1994, No. 99, pp. 31–35+.
Kay, Emily, "Transport Companies Turn to Mac for Keeping Track of Vehicles, Cargo", Mac Week, Jul. 19, 1993, vol. 7, No. 29, pp. 34–36.
Business Week, "Software Even a CFO Could Love: Smart Computers are Starting to Help", Nov. 2, 1992, No. 3291, p. 132.
EDI Update, "Germany: Hapag–Lloyd to use Edifact Bayplan Messages", Apr. 15, 1992, p. 5.
Porter, Janet, "Electronic Stowage System Unveiled", Journal of Commerce, Jan. 31, 1991, p. 2B.
J.H. Holland, *Adaptation in Natural and Artificial Systems*, University of Michigan Press, Ann Arbor, 1975.
Kirkpatrick, S. Gelatt, and Vecchi, M.P., "Optimization by Simulated Annealing", *Science*, vol. 220, 1993, pp. 671–680.
Glover, F., "Tabu Search—Part I", *ORSA Journal on Computing*, vol. 1, No. 3, 1989, pp. 190–206.
Glover, F., "Tabu Search—Part II", *ORSA Journal on Computing*, vol. 2, No. 1, 1990, pp. 4–32.
S.R. Thangiah, et al., "GIDEON: A Genetic Algorithm System for Vehicle Routing with Time Windows," Proc. Seventh IEEE Conf. on Artificial Intelligence Applications, pp. 322–328, Feb. 1991.
W.B. Powell, "Optimization Models and Algorithms: An Emerging Technology for the Motor Carrier Industry," IEEE Trans. on Vehicular Technology, vol. 40(1), pp. 68–80, Feb. 1991.
T. Kawakami, et al., "Auto Tuning of 3–D Packing Rules Using Genetic Algorithms," IEEE/RSJ Int'l. Workshop on Intelligent Robotics and Systems IROS '91, pp. 1319–1324, Nov. 1991.
S.R. Thangiah and K.E. Nygard, "MICAH: A Genetic Algorithm System for MultiCommodity Transshipment Problems," Proc. Eighth Conf. on Artificial Intelligence for Applications, pp. 240–246, Mar. 1992.
G. Lawton, "Genetic Algorithms for Schedule Optimization," Al Expert, pp. 23–27, May 1992.

*Primary Examiner*—Robert W. Downs
*Attorney, Agent, or Firm*—McDermott, Will & Emery

[57] ABSTRACT

A method for determining a stowage plan is proposed which utilizes "genetic" or "evolutionary" search techniques. The method includes the steps of generating a multiplicity of "genotypes", each of which corresponds to one possible stowage plan. Each stowage plan is then evaluated in terms of the cost of implementing it. The cost is at least a function of the weight distribution of the vessel and the number of restows required. The initial genotypes and the cost function for evaluating them are provided to the genetic algorithm which operates to reduce the cost to one below a predefined threshold.

4 Claims, 5 Drawing Sheets

5,809,489

METHOD FOR DETERMINING A STOWAGE PLAN

FIELD OF THE INVENTION

The present invention relates container shipping generally and to methods for solving stowage problems in particular.

BACKGROUND OF THE INVENTION

Container shipping has designated ports of call and designated lines (or "trade routes") between the ports along which the ships continually run. FIG. 1, to which reference is now briefly made, illustrates one such line which runs between New York City (NYC), Savannah, Rotterdam, Dover and back to NYC.

A container vessel accepts containers at each port of call which are destined for all of the other ports of call which the ship is due to visit. Thus, if the vessel is at NYC, it will accept containers for Savannah, Rotterdam and Dover and, if the vessel is at Savannah, it will accept containers for Rotterdam, Dover and NYC. At each port of call, the vessel first discharges all of the containers destined for that port and, afterwards, loads the containers which are destined for the other ports of call on the line.

FIG. 2, to which reference is now briefly made, illustrates an exemplary container vessel in cut view. The vessel has a deck 10, which is typically a number of feet above sea level, labeled 12, an engine 14 powering a propeller 16 and a superstructure 18. The vessel stores containers above and below deck in separate bays 20, each bay 20 holding a multiplicity of containers, each in its own slot 22. The bays 20 typically vary in size to match the shape of the vessel and, typically, the ship has hatches 24 within the deck 10 which cover one or two bays.

The smallest container is typically 20 feet in length and is called a "Twenty Equivalent Unit" (TEU). There are also 40 feet, "double", containers. Vessels typically carry between 1800 and 4800 TEUs.

FIG. 3, to which reference is now briefly made, schematically illustrates two exemplary bays, bay 1 and bay N, in front view. Bay 1 has 36 slots 22 above deck and 18 slots 22 below deck, where two slots, labeled 22a, are for 20 ft containers only. The slots, labeled 22b and marked with an 'x', are twice as long (in the direction into the paper) and, therefore, hold either two 20 feet containers or a single 40 feet container. The slots, labeled 22c, that are just above the hatches 24 often have electrical outlets 26 which are useful for containers with refrigeration.

FIG. 3 also illustrates the destinations for the containers in the slots 22 for the two bays. This arrangement of the containers is known as a "stowage" plan. The labels N, S and R stand for NYC, Savannah and Rotterdam, respectively.

The plan for bay 1 is relatively efficient. NYC is the port before Savannah and the N containers destined for NYC are on top of each other and separate from the S containers destined for Savannah. The one exception is in the slot labeled 22e which is the topmost slot in the "Savannah" column. In any case, removing the N containers at the NYC port will be relatively straightforward and will not necessitate any S containers to be removed first.

The plan for bay N is more problematic since the slots are inefficiently assigned to the destination ports. Thus, if the first port of call is NYC, then the R containers in slots 22d and the S containers in slots 22f must all be removed in order to remove the N containers destined for NYC. All of the removed containers must be reloaded prior to leaving port. These reloadings are known as "restows" and they incur an extra cost equivalent to utilizing the cranes of the port twice, once for unloading and once for reloading. The restows also incur extra handling time and also delay the departure time. This can incur extra costs.

Further stowage considerations include:

a) ensuring that the weight distribution throughout the vessel inflicts hydrostatic, stress and stability profiles which are within the safety limits prescribed by the authorities;

b) ventilated and refrigerated containers are located in the places which can handle them;

c) 20 ft containers are stowed in 20 ft slots and 40 ft containers are stowed in 40 ft slots;

d) 20 ft containers must be stowed beneath 40 ft containers and the lower slots must be filled before the upper slots; and e) dangerous cargo must be safely placed relative to the other types of cargo present in the vessel. The plurality of rules for stowing dangerous cargo are listed in the International Marine Organization (IMO) code.

To create a stowage plan, one must allocate the slots 22 of the vessel among the containers known to be waiting at each port. The weight distribution of the containers deviates the vessel from its optimal list and trim. The list is the amount the vessel lists to one side or another. Trim is the amount the vessel deviates from an even keel. For any given mean draft, there is an optimal trim where, at the correct trim, the propeller 16 will perform at its most efficient.

These deviations are corrected by the addition of ballast (e.g. water) which, in turn, increases the weight of the vessel. Typically, the increased tonnage increases the fuel consumption of the vessel, although, if the increased tonnage causes the vessel to be better trimmed, the propeller will be more efficient. The main cost factors for the stowage plan are thus, minimizing restows, minimizing handling time, and minimizing the amount of fuel consumed.

A stowage plan must place the incoming containers in such a way so as to minimize the cost of the trip. However, optimizing such a plan is difficult and complex since there are almost infinitely many possibilities. For example, for a small container vessel of only 20 TEU capacity and 20 containers waiting to be loaded, there are $2.4 \times 10^{18}$ possibilities. A standard vessel of 2000 slots and 700 containers to be loaded has many more possibilities.

Due to millions of possibilities, it is unreasonable to perform an exhaustive search to locate optimal solutions. Furthermore, there are numerous constraints, as described above, complicate evaluation of alternative plans. Finally, and most importantly, different aspects of the optimization function interact in a highly non-linear fashion so that it is impossible to construct a model of the problems a prerequisite to the application of classical, operations research techniques for optimization.

The Applicant does not know of any computerized tool which produces the stowaged plan without operator input. However, there are computerized graphics tools which assist a human operator in the manual stowage planning process. Examples of such systems are: SHIPS of Cosmos N.V., PLANMASTER of Maritime Computer and Technical Services, EASEACON of Marine Alignment A/S, POWERSTOW of Navis Corp. and LOADMASTER of Kockumation AB.

SUMMARY OF THE PRESENT INVENTION

It is therefore, an object of the present invention to provide a method for automatic stowage plan determination.

In accordance with a preferred embodiment of the present invention, the method utilizes "genetic" or "evolutionary" search techniques for automatically producing reasonable stowage plans. The genetic algorithm, first described in 1975 by J. H. Holland, *Adaptation in Natural and Artificial Systems*, University of Michigan Press, Ann Arbor, 1975, (article incorporated herein by reference) is a robust search algorithm based upon the principles of biological evolution. In essence, the genetic algorithm is a simulation of the evolutionary process, and makes use of the powerful operators of "natural" selection, mutation and crossover, to evolve a solution to any complex design problem.

The present invention generates a multiplicity of "genotypes", each of which corresponds to one possible stowage plan. Each stowage plan is then evaluated in terms of the cost of implementing it. The cost is at least a function of the weight distribution of the vessel and the number of restows required.

The initial genotypes and the cost function for evaluating them are provided to the genetic algorithm which operates to reduce the cost to one below a predefined threshold.

The present invention is also contemplated for other breeding types of search techniques, such as the "simulated annealing" technique and the Tabu search technique.

Additionally, in accordance with a preferred embodiment of the present invention, the cost of implementing the stowage plan includes at least a sailing cost and a port utilization cost. The sailing cost includes the expected cost of fuel for sailing between two ports and is a function of the list, trim and ballast usage of the vessel as a result of the stowage plan. The port utilization cost is a function of at least the number of loading, unloading and restow operations at at least the next port. The cost of implementing can additionally include a cargo remaining cost due to containers unstowable in the current stowage plan.

Finally, in accordance with a preferred embodiment of the present invention, the acceptance criterion is comprised of:
 A. the score being below a certain threshold value;
 B. the vessel has no list after the addition of ballast;
 C. the vessel has a trim of not more than 2 m after the addition of ballast; and
 D. the improvement in score over a period of time is minimal compared to the time required to determine the current score.

BRIEF DESCRIPTION OF THE DRAWINGS

The present invention will be understood and appreciated more fully from the following detailed description taken in conjunction with the drawings in which.

DETAILED DESCRIPTION OF A PREFERRED EMBODIMENT

Figure 1:
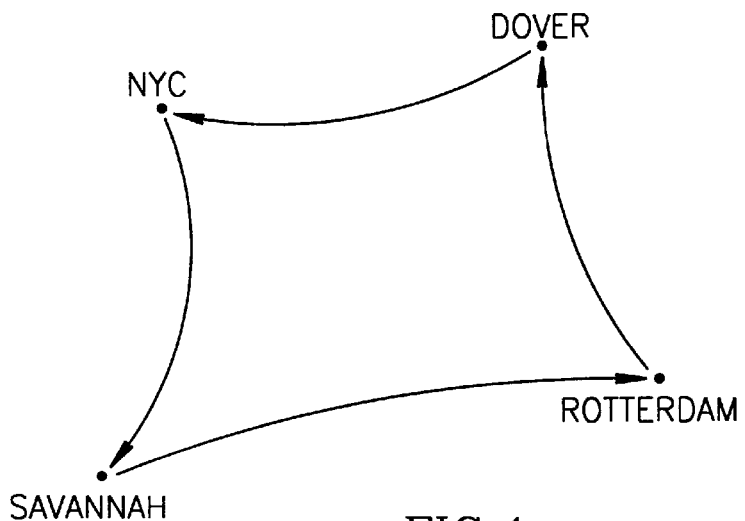
FIG. 1 is a schematic illustration of a trade route.
Figure 2:
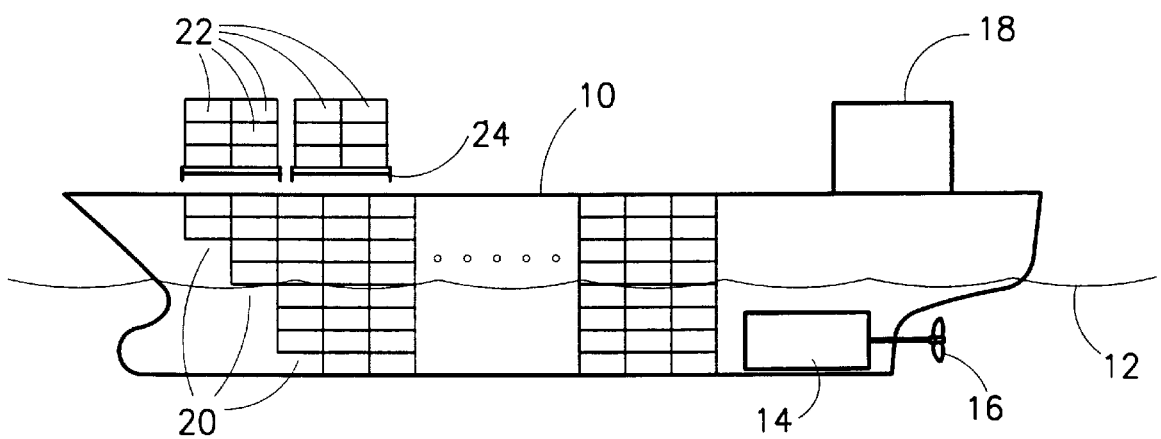
FIG. 2 is cut view illustration of a container vessel.
Figure 3:
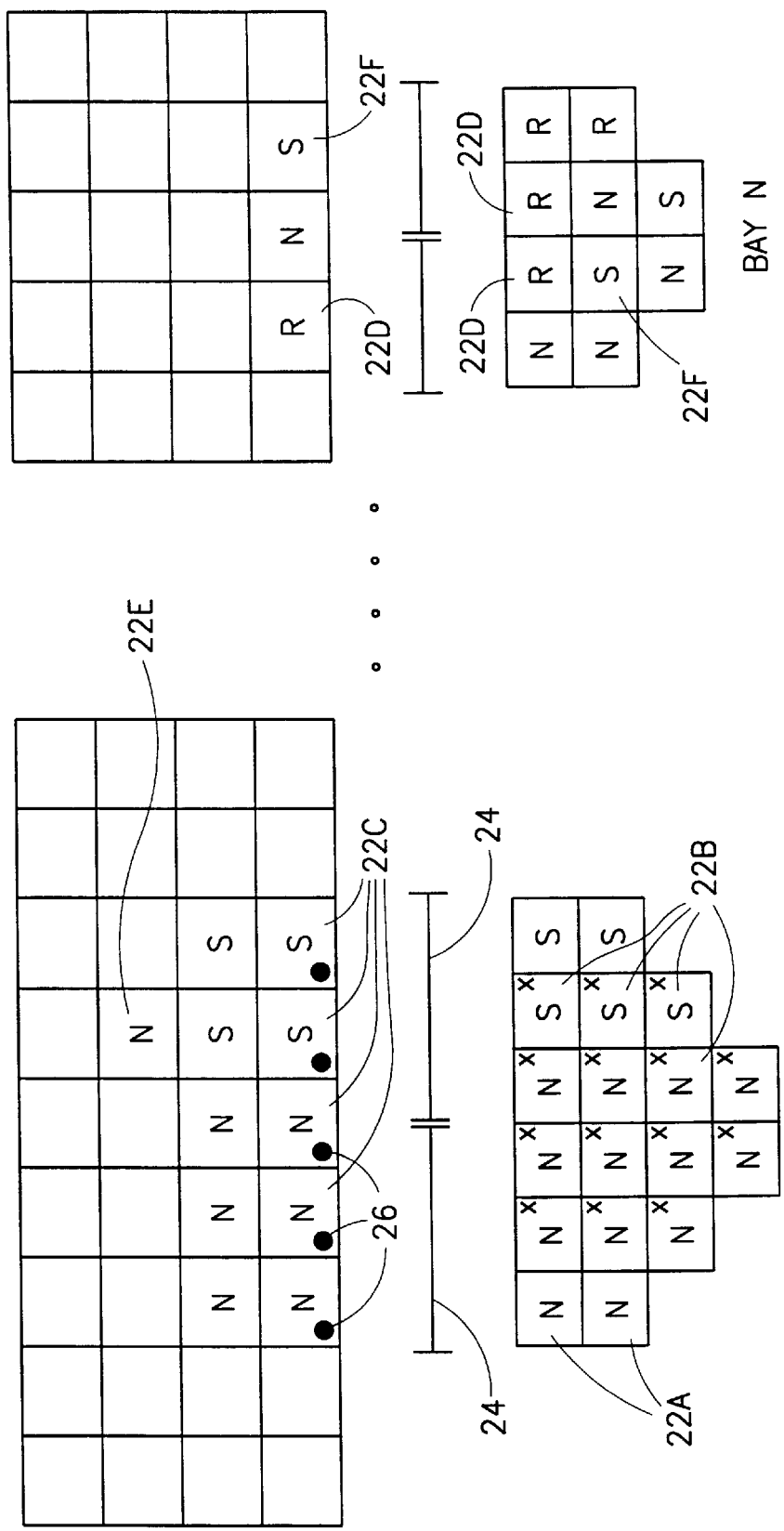
FIG. 3 is a schematic illustration of a prior art stowage plan.
Figure 4:
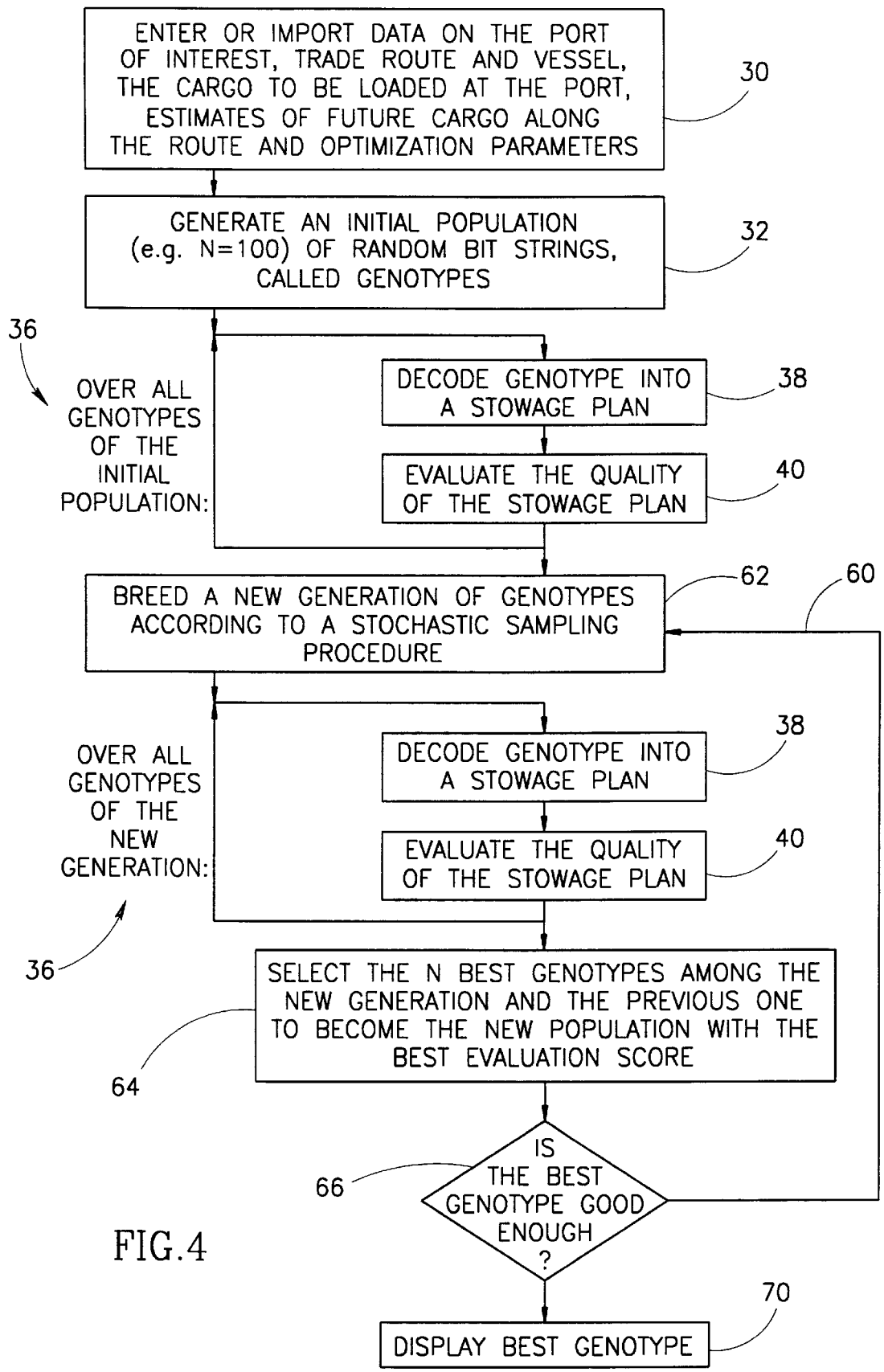
FIG. 4 is a flow chart illustration of a method for automatic stowage plan determination, constructed and operative in accordance with a preferred embodiment of the present invention.
Figure 5:
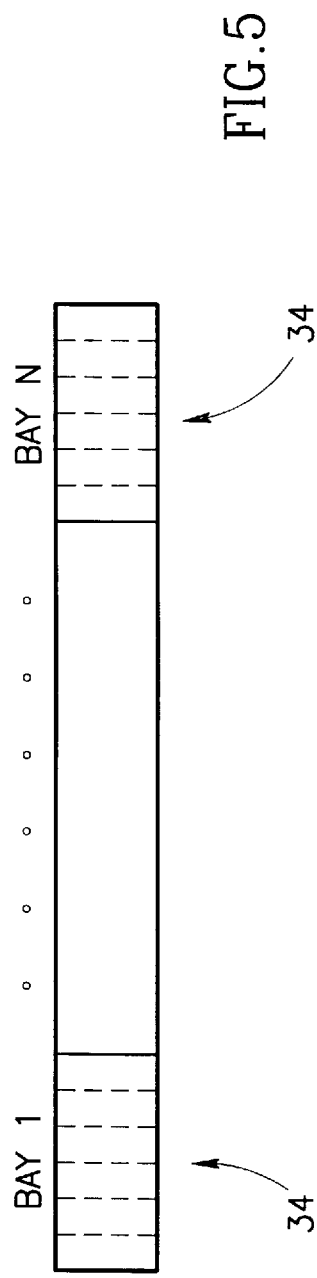
FIG. 5 is a schematic illustration of the division of information within a genotype.

Reference is now made to FIG. 4 which illustrates a method for automatically determining a stowage plan which is constructed and operative in accordance with a preferred embodiment of the present invention. Reference is additionally made to FIG. 5 which illustrates the genotype, to FIGS. 6 and 7 which detail portions of the method of FIG. 4 and to FIGS. 8 and 9 which are useful in understanding the present invention.

In accordance with a preferred embodiment of the present invention, the method utilizes genetic search techniques for automatically producing reasonable stowage plans. Other types of breeding techniques, such as the "simulated annealing" technique and the Tabu search technique, are contemplated as part of the present invention.

The present invention generates a multiplicity of genotypes, each of which corresponds to one possible stowage plan. Each stowage plan is then evaluated in terms of the cost of implementing it. The cost is at least a function of the weight distribution of the vessel and the number of restows required.

With the cost information, the population of genotypes are "bred" to select for the better aspects of each stowage plan. The breeding is weighted towards those plans whose costs are minimal.

The new set of genotypes (i.e. the new set of stowage plans) are then evaluated and the process continues until the cost is below a predefined threshold.

As shown in FIG. 4, the method of the present invention initially (step 30) collects information regarding the vessel, the trade route, and the cargo to be loaded at the port, to be loaded at future ports (e.g. within the next 5 ports) and which is currently present on the vessel. This information defines the cost function to be evaluated, as described in more detail hereinbelow.

In step 32, the genetic algorithm begins by generating a random sample of genotypes. The number N of genotypes generated depends on the operator, a typical value being N=100. The number L of bits in each genotype is a function of the number of bays in the vessel and the number of bits desired per bay. For example, the genotype may represent the allocation of destination ports for the cargo in each bay. Alternatively, the genotype may represent the slot allocation for each container over the entire vessel.

As illustrated in FIG. 5, each genotype is divided into sections 34, where each section describes the general allocation plan for a single bay. In the first example, each bay holds cargo destined for X of the G ports (for example, for two of the four ports of the trade route) and the allocation plan describes what percentage of the total amount of cargo in the bay is to be allocated for each of the X ports. Therefore, each section 34 of the genotype is further divided into G portions, where each portion describes the percentage of the bay allocated to one of the G ports of the trade route. Since each bay holds cargo for only some of the ports, some of the portions have values of 0. The following is an exemplary allocation plan in which the first bay is to hold cargo destined for NYC (35%) and Dover (65%), the second bay is to hold cargo for Savannah (25%) and Rotterdam (75%) and the last bay is to hold no cargo:

$$A=\{(35,0,0,65),(0,25,75,0) \ldots (0,0,0,0)\}$$

The allocation plan A is described in a genotype A' as follows, where each number is represented by 7 bits:

$$A = \{(01000111, 0000000, 0000000, 1000001),$$
$$(0000000, 0011001, 1001011, 0000000) \ldots$$
$$(0000000, 0000000, 0000000, 0000000)\}$$

Figure 6:
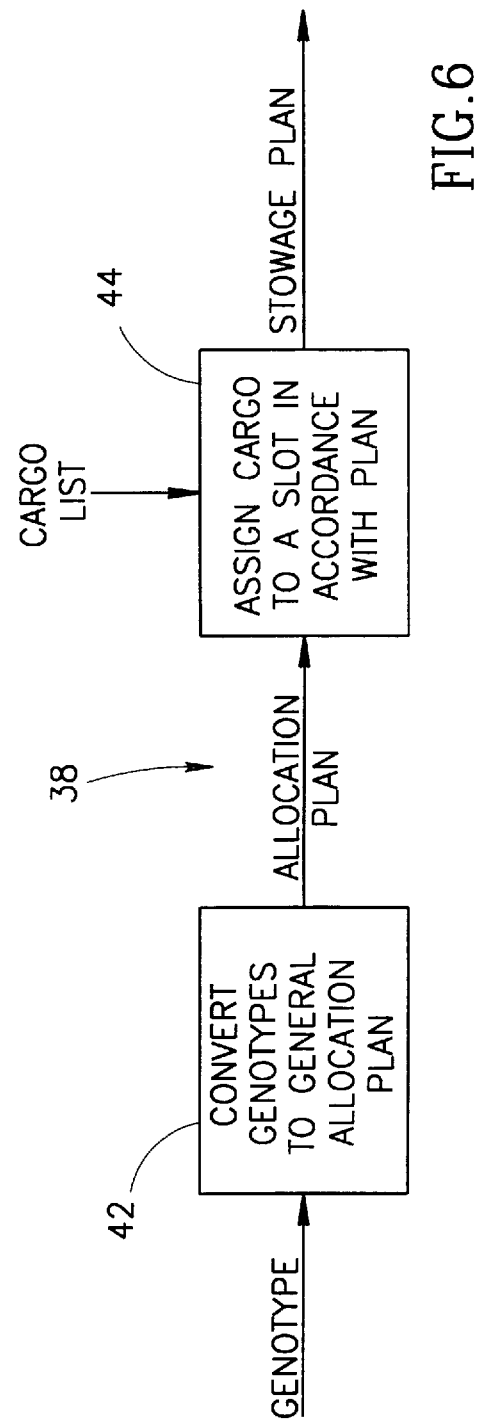
FIG. 6 is a block diagram illustration of the operations performed to convert a genotype to a stowage plan.

In step 36 (FIG. 4), the initial population of genotypes is evaluated to determine the quality of the plans they represent. Step 36 includes two substeps performed per genotype, the decoding of the genotype into a stowage plan (step 38) and the evaluation of the quality of the resultant plan (step 40). FIG. 6 details the operations performed in step 38 and FIG. 7 details the operations performed in step 40.

To decode the genotype into a stowage plan, the present invention first determines (step 42) the allocation plan defined by the genotype. Thus, the method converts the genotype A' into the allocation plan A. The present invention then selects containers from a cargo list and allocates them to a bay in accordance with their destination and the percentage allocation of the destination port within the bay. It will be appreciated that a bay may already be partially filled with containers received at previous ports and, therefore, the number of containers which are added to it must result in a final allocation in accordance with the allocation plan. It will further be appreciated that the cargo list is a listing of containers, their destinations, weight, size and any special considerations, such as connection to an outlet or type of dangerous cargo.

The allocation of containers to a bay can either be done by an operator or, in accordance with the present invention, automatically. If the operator performs the operation, he typically does so by a drag and drop operation. If the allocation is performed automatically, it is typically done by assigning each container to the first bay which has an allocation for the container's destination port. Other considerations, such as connection to an outlet and compliance with the IMO code, can be accommodated. Step 38 produces a stowage plan, that is, a listing of the containers already stored in and to be added into each bay. It is noted that, if a container cannot be stowed, due to the type of cargo it has or its need for an electrical outlet, the container is left in the port, to be shipped on the next vessel.

Step 40 (detailed in FIG. 7) involves evaluating the stowage plan produced, for this port, in step 38 and utilizes the container information stored in the cargo list and the vessel information received in step 30. In step 46, the method determines the vessel state (trim, list and stress and hydrostatic pressure distributions) which results from the stowage plan. The calculations of step 46 are the standard vessel calculations performed for any stress and stability system and are performed by all of the prior art stowage plan products.

It is noted that the stress distribution is determined per section of the vessel. Each section stress distribution is then compared (as part of step 46) to the maximal stress allowed for that section, as defined by the builder of the vessel and listed in the "stability booklet" for the vessel. If the maximal stress is exceeded at any section, ballast tanks are used to bring the stress within the safety limits. If, even with ballast, the stress is outside the safety margins, then the genotype is labeled "invalid" and no further calculations are performed for the genotype.

In step 48, the method of the present invention determines the "sailing cost" associated with the vessel state of step 46. Step 48 involves first determining the amount of ballast required to correct the list to a list of 0° and to correct or modify the trim to one which provides the propeller with the most efficient operation. The stress distribution is then recalculated with the extra ballast.

The stability booklet typically, but not necessarily, includes a table of fuel consumption at different speeds (in knots per hour) for a given draft and trim. If such information is not available, the values for vessels of a similar type can be utilized.

Once the draft and trim of the vessel has been determined, step 48 considers the stability booklet to determine the fuel consumption of the vessel at the current draft and trim for the trip between the current port and the next port. The calculation involves a selection of the average expected speed, the value listed in the stability booklet for the selected speed and the distance between the two ports. The result is the cost of fuel required for sailing the vessel, with the ballast, to the next port.

It is possible that the ballast causes a section to reach its maximal stress distribution. If so, the section cannot accept any more ballast even if such is necessary to properly trim the vessel. In this case, the vessel may have to sail without a perfect trim. It is also possible that the weight of the properly trimmed vessel is so high that the vessel will consume significant amounts of fuel, even though the propeller is working at its most efficient. Step 48 iterates to determine the trim which provides the most efficient fuel consumption.

In step 50, the method of the present invention determines the "port utilization cost" which is the cost of loading the containers at the present port and the cost of unloading containers (and restowing any containers which are in the way of containers to be unloaded) at the next few (for example, 5) ports along the trade route. The port utilization cost is a function of the crane operation cost of each port and of the number of loading, unloading and restow operations which must occur at the port. The port utilization cost can also include the cost of remaining at the port during the unloading period, a function of the number of containers which must be moved during the unloading period.

In step 52, the sailing cost and the port utilization cost are combined to produce the score for the stowage plan. The combination can either be a simple summation or a weighted one, where the operator provides relative weights for the importance of the two costs. Other cost considerations, such as the cost of storing dangerous cargo, which cannot be stowed in the current stowage plan, for shipping with the next vessel, can also be added in the score generation.

The output of the loop of step 36 is a score for each of the initial stowage plans represented by the genotypes of the initial population.

The scores of the initial population are provided to the genetic algorithm of loop 60 which "evolves" the initial population into further generations which preserve the better aspects of the stowage plans of previous generations and which improve upon them to generate a stowage plan whose cost is acceptably low.

In the genetic algorithm of loop 60, operators work on a population of genotypes. While the preferred type of genetic algorithm described herein is of the general type described as a "steady state" genetic algorithm, it should be understood that the method of the present invention could also be utilized with a genetic algorithm of the more common "generational" type in which entire populations are repetitively replaced.

In order to cause the population of possible solutions to evolve, the genetic algorithm of loop 60 preferably employs, in step 62, a form of both crossover and mutation operators. As is known in genetic algorithm systems, members of the existing population to which the operators are applied are selected stochastically based upon their score or ranking within the population. By the term "stochastically" it is meant that a member with a relatively high score has a higher likelihood of being chosen or selected for participation in the operation than a relatively low scoring member but that there is also a randomizing component so that merely having a high score does not assure selection.

Figures 7, 8, 9:
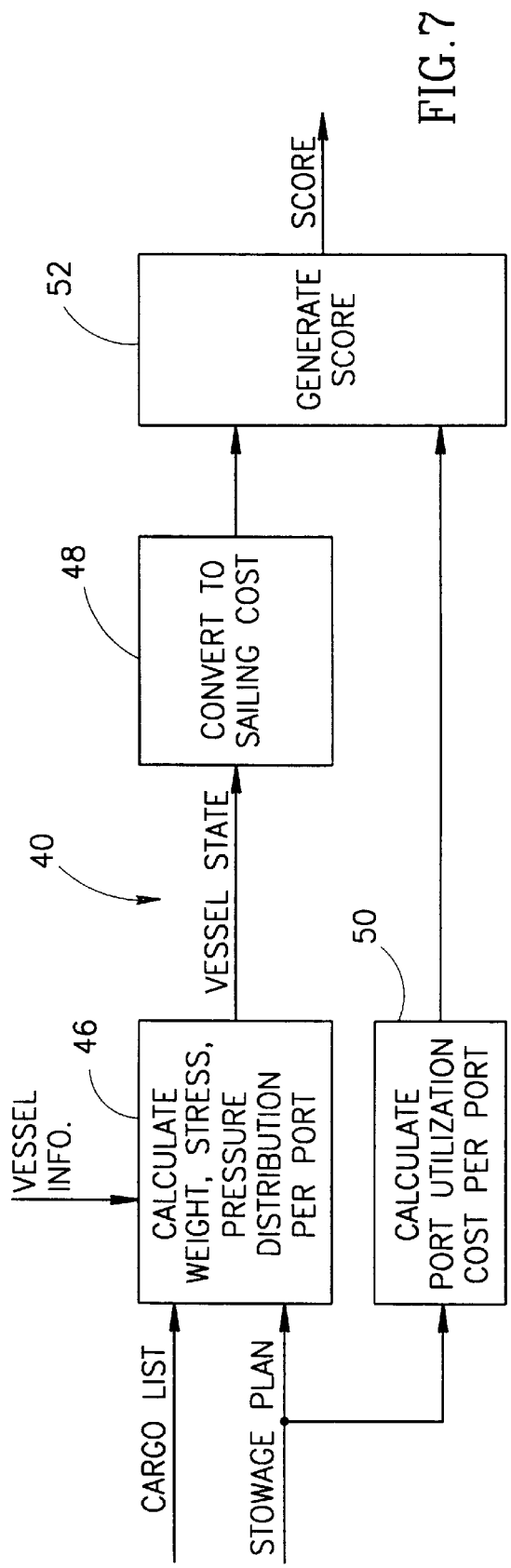
FIG. 7 is a block diagram illustration of the operations performed to evaluate the quality of a stowage plan.
FIGS. 8 and 9 are schematic illustrations of crossover operators utilized by the method of FIG. 4.

The preferred crossover operator used in the method of the present invention may conveniently be designated a "position based" crossover. For the crossover operation, two members of the existing population are selected stochastically as described previously. The two selected members are conventionally referred to as "parents". A set of positions is selected randomly. At each selected position, the position of the corresponding task in one parent are imposed on the other parent. This position based crossover is illustrated in FIG. 8. Crossover operations of this type are referred to in the art as combination or recombination operators.

Another crossover operator effective in the method of the present invention may conveniently be termed "order based" crossover. Again, a set of positions is randomly selected. The order of tasks in the selected positions in one parent is imposed on the corresponding tasks in the other parent. Again, tasks in other positions in the list are shifted to accommodate the changes and maintain a list which is complete. This form of order based crossover is illustrated in FIG. 9.

The method of the present invention also contemplates that a mutation operator will be applied at intervals to a member of the existing population. Again, the member of the existing population selected for the operation is chosen stochastically.

The new genotypes produced by the breeding operation of step 62 are then evaluated in the loop of steps 36, 38 and 40, as described hereinabove.

The present invention is also applicable with other breeding search techniques, such as Simulated Annealing and Tabu search. Simulated Annealing is described in the following article:

Kirkpatrick, S. Gelatt, and Vecchi, M. P., "Optimization by Simulated Annealing", *Science*, Vol. 220, 1983, pp. 671–680.

Tabu searches are described in the following articles:

Glover, F., "Tabu Search—Part I", *ORSA Journal on Computing*, Vol. 1, No. 3, 1989, pp. 190–206;

Glover, F., "Tabu Search—Part II", *ORSA Journal on Computing*, Vol. 2, No. 1, 1990, pp. 4–32.

All of the articles are incorporated herein by reference. Briefly, simulated annealing is a stochastic computational technique derived from statistical mechanics for finding near globally-minimum-cost solutions. Breeding a new genotype through the simulated annealing paradigm is a similar process to that of an evolutionary algorithm. In essence, a 'parent' genotype which is selected to breed a new genotype is modified by introducing a random variation to the bit values, where the variation is limited by some pre-defined maximal change. The infliction of random changes to genotype characteristics is not unlike the mutation operation described for the genetic algorithm.

The modified genotype is evaluated and accepted to replace the 'parent' genotype according to a probability function which is known as the Boltzmann probability distribution. The details of the function as well as background of the technique and its implementation can be found in the Kirkpatrick et al. reference.

Tabu search is yet another stochastic sampling method for locating near-global-minimal-cost solutions. Breeding a new solution through the Tabu paradigm requires that a group of variation genotypes be produced from the selected 'parent' genotype. The variations are simply the outcome of the mutation operator applied once to each of the group members. The quality of the group members is evaluated and the 'parent' genotype is replaced with the best member of the group.

Once a new genotype is adopted as the new 'parent' genotype, destined to produce the next genotype generation, its difference from its original parent genotype is recorded. The recorded difference is labeled as a "taboo" change which cannot be reversed for a period of time in the creation of subsequent variations in future generations. The list of taboo changes is of a limited size so old taboos have to be discarded to make room for new ones.

The details of the function as well as the background of the technique and its implementation can be found in the two F. Glover references.

In these embodiments, these techniques are performed at step 62. The remaining steps are not changed.

In step 64, the genotypes for the next generation are selected. They consist of N of the best genotypes from among the current generation and the previous generation, where "best" is defined as having minimal scores.

In step 66, the score of the best genotype is reviewed against an acceptance criterion. One possible acceptance criterion requires all of the following criteria to be met:

a. the score is below a certain threshold value;

b. the vessel has no list after the addition of ballast;

c. the vessel has a trim of not more than 2m after the addition of ballast; and d. the improvement in score over a period of time is minimal compared to the time required to determine the current score.

If the best genotype is below the acceptance criterion, the method of the present invention finishes and displays, in step 70, the result. Otherwise, the genetic algorithm of loop 60 is repeated. Typically, loop 60 also contains a condition that it be performed no more than X times, in order to ensure producing a final solution.

It will be appreciated by persons skilled in the art that the present invention is not limited to what has been particularly shown and described hereinabove. Rather the scope of the present invention is defined only by the claims which follow:

I claim:

1. A method for determining a stowage plan, the method comprising the steps of:

a. representing allocation plans as genotypes and generating a first population of genotypes;

b. creating stowage plans from said allocation plans and from a cargo list;

c. evaluating the quality of said stowage plans and producing a score for each stowage plan and its associated genotype;

d. breeding a new population of genotypes from said first population of genotypes at least partially in accordance with said scores;

e. repeating said steps of creating, evaluating and breeding until one of said scores achieves a predetermined acceptance criterion; and f. producing as output the stowage plan whose associated scored is the output of step e, wherein said step of evaluating includes the step of determining at least a sailing cost and a port utilization cost.

2. A method according to claim 1 and wherein said sailing cost includes the expected cost of fuel for sailing between two ports and is a function of the list, trim and ballast usage of the vessel as result of said stowage plan.

3. A method according to claim 1 and wherein said port utilization cost is a function of at least the number of loading, and restow operations at at least the next port.

4. A method according to claim 1 and wherein said step of evaluating additionally includes the step of determining a cargo remaining cost due to containers unstowable in the current stowage plan.

* * * * *